US008072353B2

(12) United States Patent
Lamont et al.

(10) Patent No.: US 8,072,353 B2
(45) Date of Patent: *Dec. 6, 2011

(54) ARCHITECTURE FOR CREATING, ORGANIZING, EDITING, MANAGEMENT AND DELIVERY OF LOCATIONALLY-SPECIFIC INFORMATION TO A USER

(76) Inventors: Ivan J. Lamont, San Francisco, CA (US); James N. Withrington, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/643,119

(22) Filed: Dec. 21, 2009

(65) Prior Publication Data

US 2010/0121878 A1 May 13, 2010

(51) Int. Cl.
*G08G 1/123* (2006.01)
(52) U.S. Cl. .............. 340/988; 340/995.1; 340/995.16
(58) Field of Classification Search .............. 340/988, 340/990, 995, 991, 993, 995.1, 995.11, 995.12, 340/995.14–995.16
See application file for complete search history.

(56) References Cited

U.S. PATENT DOCUMENTS

| | | | |
|---|---|---|---|
| 5,485,618 | A | 1/1996 | Smith |
| 5,649,300 | A | 7/1997 | Snyder et al. |
| 5,717,392 | A | 2/1998 | Eldridge |
| 5,767,795 | A | 6/1998 | Schaphorst |
| 5,781,195 | A | 7/1998 | Marvin |
| 5,802,492 | A | 9/1998 | DeLorme et al. |
| 5,890,172 | A | 3/1999 | Borman |
| 5,945,985 | A * | 8/1999 | Babin et al. .................. 715/209 |
| 6,199,045 | B1 | 3/2001 | Giniger et al. |
| 6,282,362 | B1 | 8/2001 | Murphy et al. |
| 6,402,614 | B1 | 6/2002 | Schneier et al. |
| 6,442,479 | B1 | 8/2002 | Barton |
| 6,459,388 | B1 | 10/2002 | Baron |
| 6,572,662 | B2 | 6/2003 | Manohar et al. |
| 6,607,439 | B2 | 8/2003 | Schneier et al. |
| 6,791,471 | B2 | 9/2004 | Wehner et al. |
| 7,187,377 | B1 | 3/2007 | Pella et al. |
| 7,334,190 | B2 | 2/2008 | Wierowski |
| 2002/0091793 | A1 | 7/2002 | Sagie |

(Continued)

FOREIGN PATENT DOCUMENTS

WO       WO 01/91414 A      11/2001

(Continued)

OTHER PUBLICATIONS

International Search Report dated Dec. 4, 2006.

*Primary Examiner* — Daniel Previl

(57) ABSTRACT

Disclosed herein is a dynamic content design, delivery and distribution software architecture that enables a centrally located designer, using a graphical interface, to create, edit, manage, and organize a matrix of trigger points that are plotted on a computerized map of geographical space. Each of these trigger points may be tagged with content, which is then relayed to a dynamic client device that is remotely located. The client device then displays the content to a remote user in a manner predetermined by the centrally located designer, the content varying based on feedback provided by the client device. The system and methods disclosed enable a centrally located designer to assume the role of an automated tour designer. As such, designers can compile a variety of different tours, each aimed at users with particular preferences. The architecture further offers a means to publish tour scripts for public consumption. The system is sufficiently flexible for use in any instance in which a user requires dynamic content, which is displayed contingent on any number of conditions.

10 Claims, 8 Drawing Sheets

U.S. PATENT DOCUMENTS

2002/0183072 A1 12/2002 Steinbach
2002/0198991 A1 12/2002 Gopalakrishnan et al.
2003/0009281 A1 1/2003 Whitham
2003/0020816 A1 1/2003 Hunter et al.
2003/0182052 A1* 9/2003 DeLorme et al. ............. 701/201

FOREIGN PATENT DOCUMENTS

WO  WO 02/17567 A  2/2008

* cited by examiner

ARCHITECTURE FOR CREATING, ORGANIZING, EDITING, MANAGEMENT AND DELIVERY OF LOCATIONALLY-SPECIFIC INFORMATION TO A USER

The present application claims the benefit of and priority to U.S. patent application Ser. No. 11/399,939 entitled "Architecture For Creating, Organizing, Editing, Management And Delivery Of Locationally-Specific Information To A User In The Field," now U.S. Pat. No. 7,652,594, filed on Apr. 7, 2006 which claims the benefit of and priority to Provisional Patent Application No. 60/669,828 entitled "Architecture For Creating, Organizing, Editing, Management And Delivery Of Locationally-Specific Information To A User In The Field," and filed on Apr. 8, 2005, and is hereby incorporated by reference.

FIELD OF THE INVENTION

The system relates to any field requiring persons or a group of persons seeking a time-efficient and cost-effective method for constructing a tour of a village, town, city, region or country employing locationally-sensitive information.

BACKGROUND OF THE INVENTION

Location-sensing technologies have been available for many years. Global Positioning Systems (GPS) are among the most commonly used systems. Software has been available for some time that provides navigational assistance using GPS capability, which delivers both audio and visual information to assist persons in navigating around an unfamiliar city, for example. Prior art in this field discloses numerous methods and systems for delivering content to a user's mobile device, the content varying based on the user's location, orientation, speed, or acceleration.

While delivery of location-specific content to a mobile device is an obvious and well-documented art, prior art in the field focuses on the dissemination of content to a remote user. The art fails to address how the content is created, compiled, and stored. There is presently no system that combines flexible content creation, compilation and storage with a delivery mechanism.

SUMMARY

Disclosed herein is a software architecture that enables a centrally located designer to create, edit, manage, and organize a matrix of trigger points that are situated in geographical space and are tagged with dynamic content, and then relay these trigger points to a mobile device that is remotely located. The trigger points cohesively instruct and inform the remote user in a manner predetermined by the centrally located designer. This architecture is a hierarchy of software programs orchestrated by a governing application engine. These software programs and the application engine function in concert to manifest an integrated system that allows ease of creation and editing of trigger points to create a chain of trigger points in space. The architecture further allows free association of audio/visual or other content to one or more of the trigger points to create a pre-determined user experience.

The hardware employed comprises a server device and a client device. These devices are by definition remotely located, however they are not independent of each other. The devices initiate communication with one another via the Internet, wireless data transports or any other system capable of enabling communication between the devices. This enables dynamic interaction between the server device and the client device. The software has components that run on the server device as well as the client device.

The server computer's role, as enabled by the software, is to enable a designer to construct and edit a matrix of trigger points that are located in geographical space. Each of these trigger points may be tagged with audio and/or visual content. The collection of these trigger points together will be referred to as a tour script, or simply as a tour. The tour script is executed by the client device, which visually or acoustically displays the content to a user. The server device also compiles a library of content that can be distributed to the client. This content can be compiled either in a pre-designated sequence or it can be adapted to react to the behavior of the client.

The client device is assigned the primary role of executing the tour script in response to a user's direction, temporal state, velocity, rate of incline or decline, or any other variable. The system may function wherever the user is located, with the only limitation that the user must have a GPS signal for determining the required variables. The tour script may be downloaded onto the client device for local execution, thus eliminating the need for a client to be in constant communication with the server via Internet, wireless data transport, or any other system. The client device's role is not merely as a docent, but also to feedback information to the server, which can adapt and update the client's library of available content.

Once deployed, the system disclosed can facilitate the economical creation and delivery of tour scripts that can inform and instruct a remote user for uses such as: an automated guided tour, a treasure hunt, a real estate tour, architectural overview, a line of approach/instruction for trainee pilots, and distribution of targeted sales and marketing information. The system also presents a means for delivery of tour scripts from anywhere in the world, from one server to any number of clients. In addition, the tour scripts can be catalogued via an Internet repository and downloaded by users to their mobile devices for any purpose or activity that they desire. This central repository can then package and distribute any number of tour scripts, each tailored to the distinct preferences of a user.

A software architecture and methods for executing the same bring together content creation, delivery, and Internet cataloguing of tour scripts. The tour scripts are comprised of dynamic trigger points, which are easy-to-manipulate building blocks of tour creation that contain audio or visual content.

DETAILED DESCRIPTION

A method and system for creating and uploading a tour script to a remote client device are disclosed. The tour script comprises a number of dynamic trigger points, each trigger point being associated with audio and/or visual content to be conditionally displayed depending on a number of variables. Each of the variables may be provided by the client device, and may include such measurements as: directional choices, temporal state, velocity, or rate of incline or decline. The present disclosure further includes a central repository for storing a number of tour scripts. This repository may be a central server or Internet storage. Users may access the repository through their client device to download one or more tour scripts.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will be apparent from the description below.

The disclosure can be roughly broken down into two components, the server-side and the client-side. Following a DESCRIPTION OF OPERATION, each of these two components will be addressed separately, though it will be understood by those of skill in the art that the server device and client device work coextensively with each other.

DESCRIPTION OF OPERATION

Trigger Points/Components

The key component in the operation of the system is the trigger point. The system enables a central designer using a server device to arrange trigger points in space and freely assign information to them that a user on a client device will experience. Trigger points are thus key operators in the software configuration. For versatility, the software includes a means to assign multiple ways a trigger point can be activated. This conditionality is a key component of the software's flexibility and uniqueness. Thus, as waypoints are clustered together, it is possible to manifest any number of outcomes for the user. This has the effect of yielding a powerful tool for a skilled designer.

Figure 1:
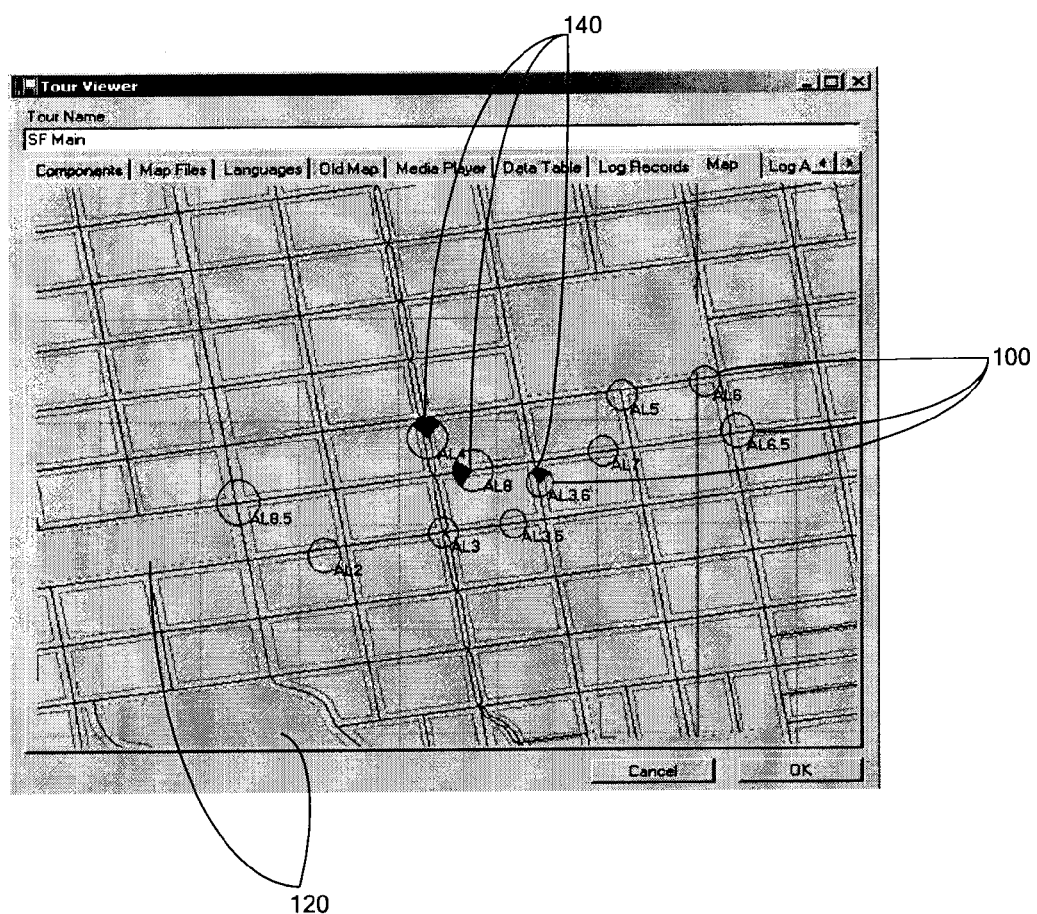
FIG. 1 illustrates a portion of an exemplary map used for creating a tour script.
Figure 5:
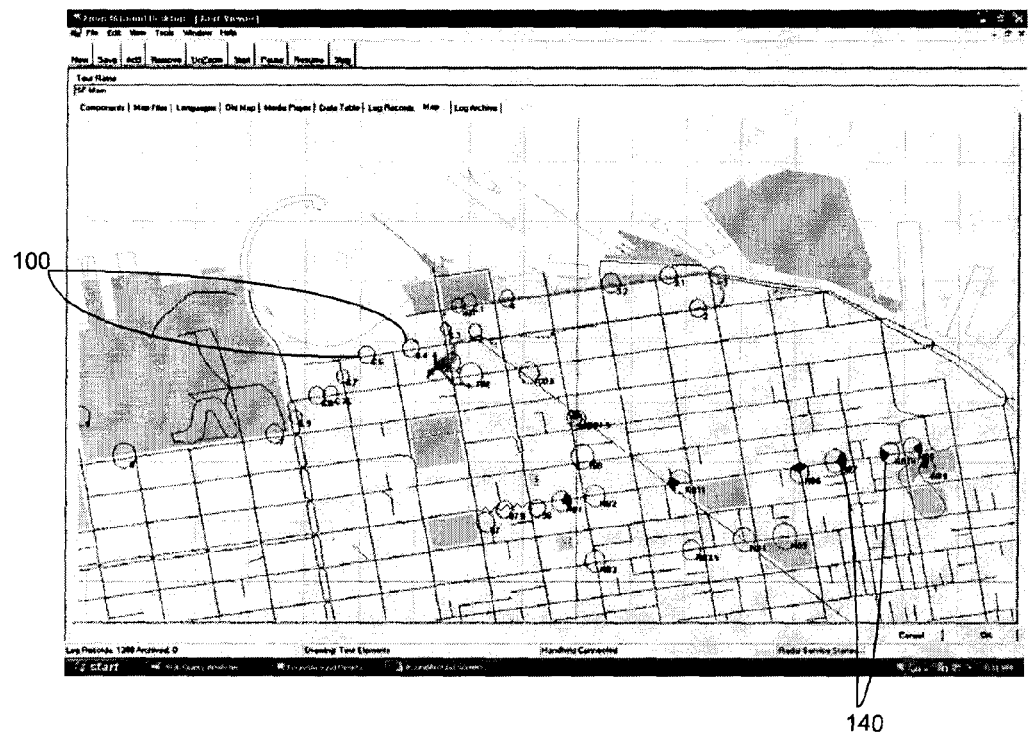
FIG. 5 illustrates a portion of an exemplary map used for creating a tour script.

FIG. 1 shows an exemplary map implementing trigger points 100. The trigger points 100 are organized around a number of parks 120 in a neighborhood. Each trigger point 100 has a set dimension and location. Some have triangles 140 inset. The triangles 140 denote the angle of entry into the trigger point 100 that will initiate display of the associated information. The result is that a user entering the trigger point 100 from an angle outside the triangle 140 will not experience the associated information. This enables flexibility in designing a route that is in a confined area where trigger points 100 may be clustered together. A number of different conditions (FIG. 3 330) can be associated with each trigger point 100, including: velocity, direction, etc. FIG. 5 shows another exemplary map implementing trigger points 100, some with triangles 140.

Trigger points 100 can be used to initiate single events or they can be grouped together to form a chain-reaction of events. To accomplish the latter, using the software one could assign a Boolean operator to each sequence of trigger points 100 that pre-determines an outcome if a preset string of conditions 330 are met.

For example, consider a sequence of trigger points 100 arbitrarily labeled T1, T2 & T3. The tour script may operate as follows: IF T1 Speed>30 mph AND T2 Direction is North Easterly OR T3 Direction is North westerly, THEN Trigger "You may be going to fast to make the right turn on Acacia Avenue (T2), so you may want to take right on Beverly Blvd (T3)." Trigger point T1 may have another assigned event that would only trigger if speed was less than 30 mph. The same may be true of T2 & T3. Such functionality can add more creative possibilities and power to the tour designer.

The visual form of the server portion of the software allows the user to manipulate each trigger point 100 in all manner of ways. For example, the user can alter its diameter, the assigned conditionality, and the location of the trigger point 100. One could also play the media list associated with the trigger point 100.

Trigger Point Layering

The trigger points 100 can be organized using a layering method. This entails each layer being assigned a certain attribute. This makes for ease of organization and manipulation. Thus different layers of a tour can be worked upon in unison. All trigger points 100 on a certain layer will perform a similar function on the tour. Examples of layers include:

Directional Layer: This is the most elemental layer and would contain only directional prompts.

Safety Layer: A safety layer that would contain trigger points 100 that have speed warnings or warnings about freeway entry ramps that would trigger only if the vehicle was a motor-driven cycle.

Descriptive Layer: The descriptive layer is where the anecdotal information or the multimedia components of the experience reside.

Figure 3:
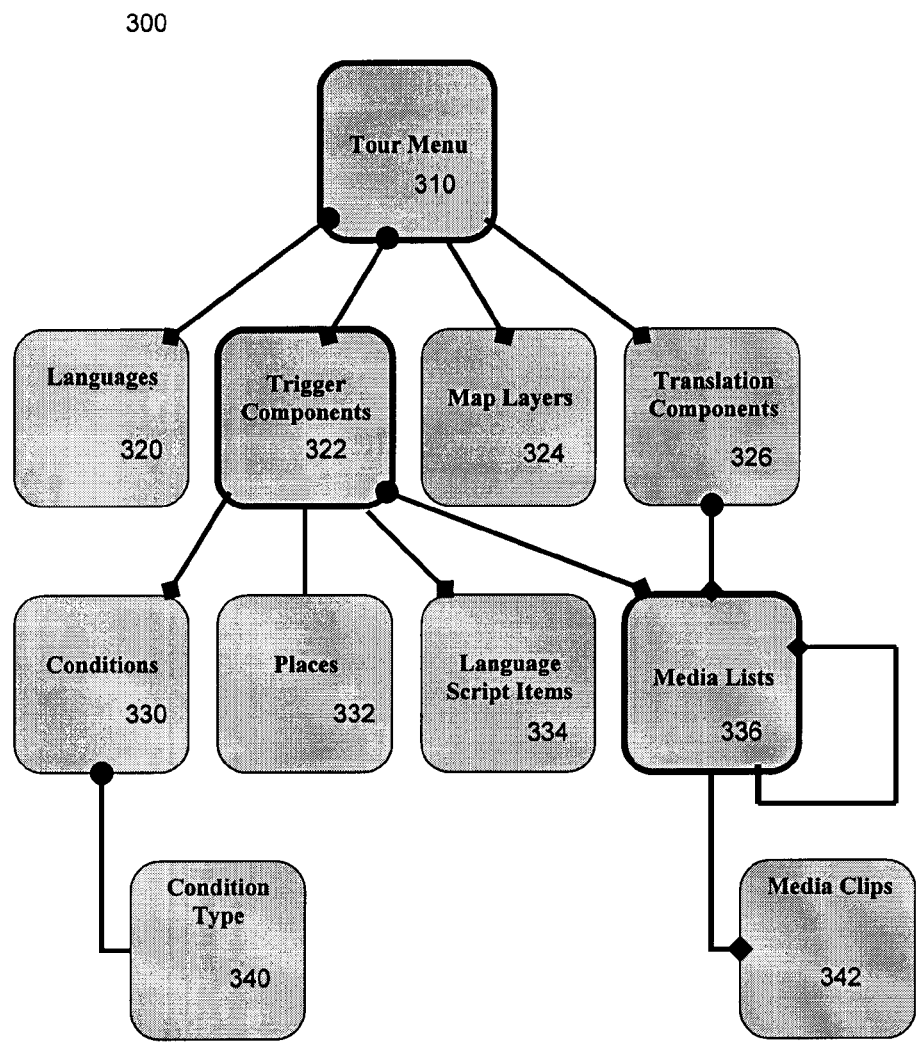
FIG. 3 illustrates a block diagram of objects residing in an exemplary client device.

Multimedia Layer: This layer would contain sound or media clips (FIG. 3 342).

Figure 2:
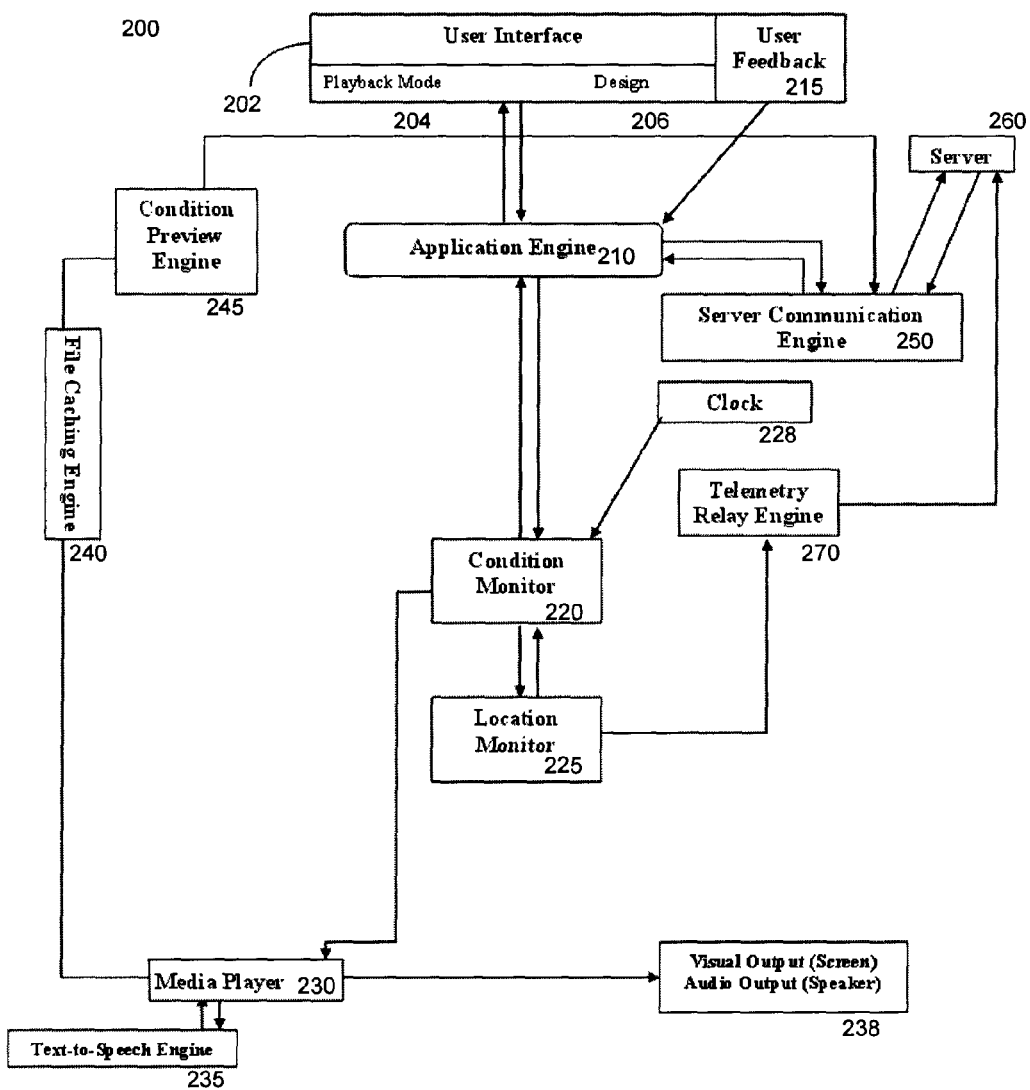
FIG. 2 illustrates a block diagram of processes run on an exemplary client device.

Each layer can be turned on or off in the tour editor/viewer, or on the client device (FIG. 2 200).

Content Creation & Management

The various media lists that reside within different layers are organized in a directory tree similar to the file structure in Microsoft® Windows. This forms a library of content that is organized as generic or specific. For example, content on the directional layer may be assigned multiple times in a tour, since it is not location-specific.

Multiple languages may be assigned to the tour script whereby each media clip 342 automatically associates with the appropriate trigger point 100.

The software enables two types of tour construction methods:

linear sequential tour script free roam tour script

In one embodiment, the linear sequential method, the tour is a string of trigger points 100 arranged by the tour designer along a pre-determined path that delivers information in a preset order. These can be organized around specific topics or may a general city tour. Even though the tour is preset, the user may still affect the tour by making a number of choices and additionally by the mere variability in the user's location, speed, rate of incline, etc.

In another embodiment, the free roam tour script is a software construction that allows users to free roam at will around a region. This means that a user can move wherever it wishes and the client device 200 will adapt its display to the actions of the user. Variables affecting the display include but are not limited to: speed, location, velocity, rate of incline or decline, etc. The software does this by deployment of a relative media list (FIG. 3 336) conditionally assigned to a trigger point 100. This is described in some detail below.

Deployment of Media List and Trigger Conditionality

A tour script is comprised of a number of media lists 336, each list 336 being initiated by the satisfaction of one or more conditions 330 being met. By means of example, considering the following list in which a user will hear information about a City Hall building, and will be directed to look in the correct direction regardless of the direction of travel. If the user does not leave the area where the media list 336 was triggered by the time the List Breakpoint is reached, the user will hear additional information about City Hall. If the device is in "free roam" mode, the media list 336 instructing the user to travel to the next location (north towards Geary Street) will be omitted.

Example: The following four media lists 336 may be triggered when a user enters a trigger point near City Hall. Each media list 336 is comprised of a number of media clips 342, as follows:

Media List: City Hall

| Element Type | Script | Info Descriptor | Name |
|---|---|---|---|
| Media Clip | We are now on Van Ness Avenue. | Informational | Van Ness |
| Media List | On <East> you can see City Hall | Informational | Look At City Hall |
| Media List | Please go <North> five blocks | Directional | Go to Geary |
| Media Clip | Be careful at Turk Street as cross traffic does not stop. | Safety | Careful at Turk |
| List Breakpoint | Check location | | |
| Media Clip | City hall was built by people, a while ago. | Informational | City Hall Detail |

Media List: Look at City Hall

| Element Type | Script | Info Descriptor | Name |
|---|---|---|---|
| Media Clip | On | Informational | On |
| Media List | East Translation | Informational | East Translation |
| Media Clip | . . . you can see city hall. | Informational | Careful at Turk |

Media List: East Translation—The Media List "East Translation" compares the indicated direction, East, with the direction of travel, so that if the device is traveling south, the translation will produce the Media Clip that says "To your left".

| Element Type | Script | Info Descriptor | Name |
|---|---|---|---|
| Media Clip | Ahead and to your left | Directional | |
| Media Clip | To your left | Directional | |
| Media Clip | Behind and to your left | Directional | |
| Media Clip | Behind you | Directional | |
| Media Clip | Behind and to your right | Directional | |
| Media Clip | To your right | Directional | |
| Media Clip | Ahead and to your right | Directional | |
| Media Clip | Ahead | Directional | |

Media List: Go to Geary

| Element Type | Script | Info Descriptor | Name |
|---|---|---|---|
| Media Clip | Please go | Directional | Please go |
| Media List | North Translation | Directional | North Translation |
| Media Clip | . . . five blocks | Directional | 5 Blocks |

Tour Design Tools

Text-to-Speech Engine (FIG. 2 235)

Given that voice talent can be expensive to narrate any potential tour, in one embodiment a text-to-speech engine 235 is incorporated that converts written script into computer-synthesized audio files that are tagged automatically to the appropriate trigger point 100. This enables an efficient means to test a tour script before commitment of funds to render a final production. Alternatively, one could license software that has a more naturalized voice rendition to remove the need for a voice actor altogether.

Graphical Overlay of Trigger Points 100 Over Time

This is another interface on the tour viewer that enables the designer to see each of the trigger points 100 and their assigned audio segments as bars like in a Gantt Bar chart. This is a different type of view that enables the designer to ensure that the trigger points 100 placed and narration durations at any given speed will not overlap. It is akin to a musical score that that a composer might use to refine a piece of music.

Figure 6:
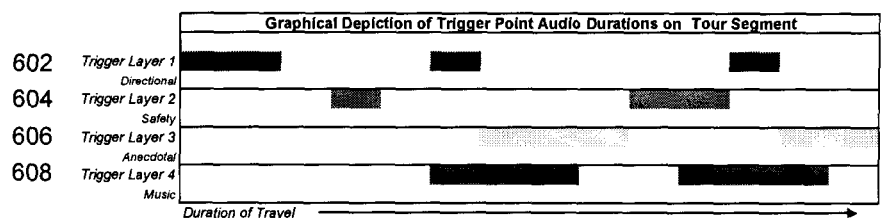
FIG. 6 illustrates an exemplary graphical overlay of media lists.

FIG. 6 illustrates an example of what a graphical overlay of media lists might look like according to one embodiment. The figure shows four different media lists 602, 604, 606 and 608. The chart should be read from left to right, indicating the progression of time. Where two media lists 602, 604, 606, 608 are vertically aligned, those lists 602, 604, 606, 608 will be simultaneously displayed. (either audibly or visually)

Simulation Editor

Here the tour script is played back as if a vehicle were traveling along the tour script route. This combines multimedia video and music or narration segments to deliver a simulation, so that tours can be experienced in summary form before they are embarked upon. Video segments of the tour would be contained in the media tree. This may be edited as a brief display for marketing, for example.

Audio Parser

This tool enables the designer to parse words from an audio file and fuse them back together to yield a desired narration that may not be available Exemplary Uses Examples of how the software can be used are:

Orchestration of a Fleet of Tour Vehicles Under One Structure

Here, the server device (FIG. 2 260) and client devices 200 are connected via wireless area network (WAN). The server contains a library of potential tours of the surrounding region. Each vehicle has a client device 200. A vehicle could be an automobile, bicycle, motorcycle, or any other vehicle. As tour requests come in from different users, the server device 260 can allocate each desired tour from a menu of available tours. The tour is then broadcast to that vehicle via the WAN. The client device 200 is then instructed to "ping" the Server computer with a confirmation that it has received all the data required to execute the tour. If files are lacking in the client device 200, then a subroutine is executed to enable the transfer of the required data until all the required files are available. The person taking the tour can then proceed out of the WAN range. As the vehicle returns to the building it will notify of its whereabouts and broadcast a data packet that confirms which vehicle it is and which tour it is finishing. Vehicle log data will be exchanged so that the server can log mileage, average speed, etc. of the vehicle. The server will scan this log to see if any prohibited areas or illegal maneuvers were performed, as compared against the information in the safety layer.

Orchestration of a Fleet of Tour Standard Automobiles as Tour Vehicles from any Structure Here the client device 200 is contained within a box that is compact and discreet. It can be held anywhere convenient for a tour experience. The unit contains several combinative components that include the client device 200, software configuration, independent power supply, antenna, and radio broadcast device. This unit would be delivered to a user who has their own automobile who would then tune their FM radio into the unit that is situated in the trunk or other location in the vehicle. This has the advantage of turning any vehicle into a tour guide. It offers a solution independent of the vehicle's existing specifications.

Orchestration of Walking Tours Throughout Network of Hotels in City

In this configuration, the concierge of a hotel desk would have a PC on their concierge desk. They would have several client devices 200 on hand. The concierge can assist the hotel guest in what tour they would like to undertake. To do this they can employ the tour simulation that is created using the tour simulation editor. Once the guest has determined their preferred tour the concierge would upload this tour from the server to the client either using a WAN or a hot sync cradle. The guest would then depart the hotel and begin their tour. If the client device 200 was configured to be locationally-aware using a GPS-antenna, then this could be sewn into a cap that the user would wear to shelter them from the sun or rain. The antenna may be on the peak of the cap to get the maximum of triangulation data. The client device 200 would broadcast the audio to a set of earphones via a Bluetooth configuration, excluding the need for wires. A cheaper alternative would be for a host tour guide to have the client device 200 and a hat to broadcast the content via radio transmission to a group of tour participants who could be located nearby. The tour guide can amplify any narration issued by the client device 200.

Orchestration of a Residential Real Estate Tour

Here the server device 260 is employed by a tour designer who is hired by a realtor or groups of realtors to design residential tours for their clients seeking to buy a home. The tour designer, who is using the system, organizes a tour of homes currently on the market, which is filtered by the realtor as meeting that particular buyer's preferences. The client device 200 is passed to the buyer through their realtor. The software is employed to create tours of home for sale, perhaps on a weekly basis. The buyer would go on a tour each Sunday and get a narrated tour of each home in their own vehicle via the client device 200 on a similar basis to that described above. If there was an "Open House," the buyer could enter the home if the narration sparked their desire to view inside. The tour would be delivered via the realtor's website and downloaded by the buyer just before they embark upon a tour.

Orchestration of a Commercial Real Estate Locationally-Aware Database

Here the utility of the system is reliant on the server's ability to stream database information to a user in the field who is moving through a village, town, city, region or country.

Real estate information historically has been fragmented and located on disparate databases. The system allows the user to create a tour that has dynamic Internet-based web pages as its media to be played to the user. These pages are created on arrival at waypoints in the tour, showing such information as current facts and figures on the property, who owns the building, contact information, tenants in the building, most recent rents paid, and public tax records. This tool, when combined with a mobile phone, could create a virtual office for a real estate professional. The software unifies these technologies to render a powerful means of speeding information transfer among real estate professionals.

Welcome Channel in Taxi Cab

Here the tour system would be deployed in a taxicab setting, using the mobile box configuration described above. The tour script would be on free roam mode, employing the media list 336 relative conditionality, describe above. The tour designer would have supplanted, for example, trigger points along the primary arterial route to and from the metropolitan airport. After disembarking a flight, the passenger may hail a cab and then at the beginning of the journey ask driver to tune into the "Welcome Channel," after perhaps seeing a logo sticker denoting its availability. As the cab travels along the arterial and toward the passenger's destination, the tour system describes what they are driving by and informs and entertains. It may provide advertising segments as particular attractions are passed.

A Tour that Connects to Outdoor (GPS and GPRS Triangulation) and to Indoor (Wireless Network) Triangulation This configuration utilizes the software's ability to take locational data from multiple sources. An example would be a tour that is being conducted around a city using the tour vehicle method described above. As the user passes a museum, they are enticed to explore this attraction in more detail. The system then instructs them to pick up the mobile client device 200 and walk into museum with it. As they enter the building, the client logs onto the wireless network and identifies itself. If there is any entry fee this would not be paid in cash but added onto the tour price and paid upon return of the device. The tour operator might later pass this to the museum. As the person moves through the museum the client device 200 would provide them with a tour of the exhibits and artifacts. When they are done, they go back out to their vehicle and resume the outdoor tour as before.

Interfacing Tour Design and Delivery Software with a Telecom Infrastructure

By integrating the tour creation software with a telecom/GPRS delivery system, it would be possible to deliver tours over either current mobile phones or mobile PC client devices 200. In this example, customers seeking tours would go online and choose a tour, created previously by the software, and then dial in with their device when they wish to undertake that tour. The telecom server would then either run the software (in the case of the "dumb client" mode) or transport required media to the mobile PC device (in the case of the "smart client" mode).

Figure 7:
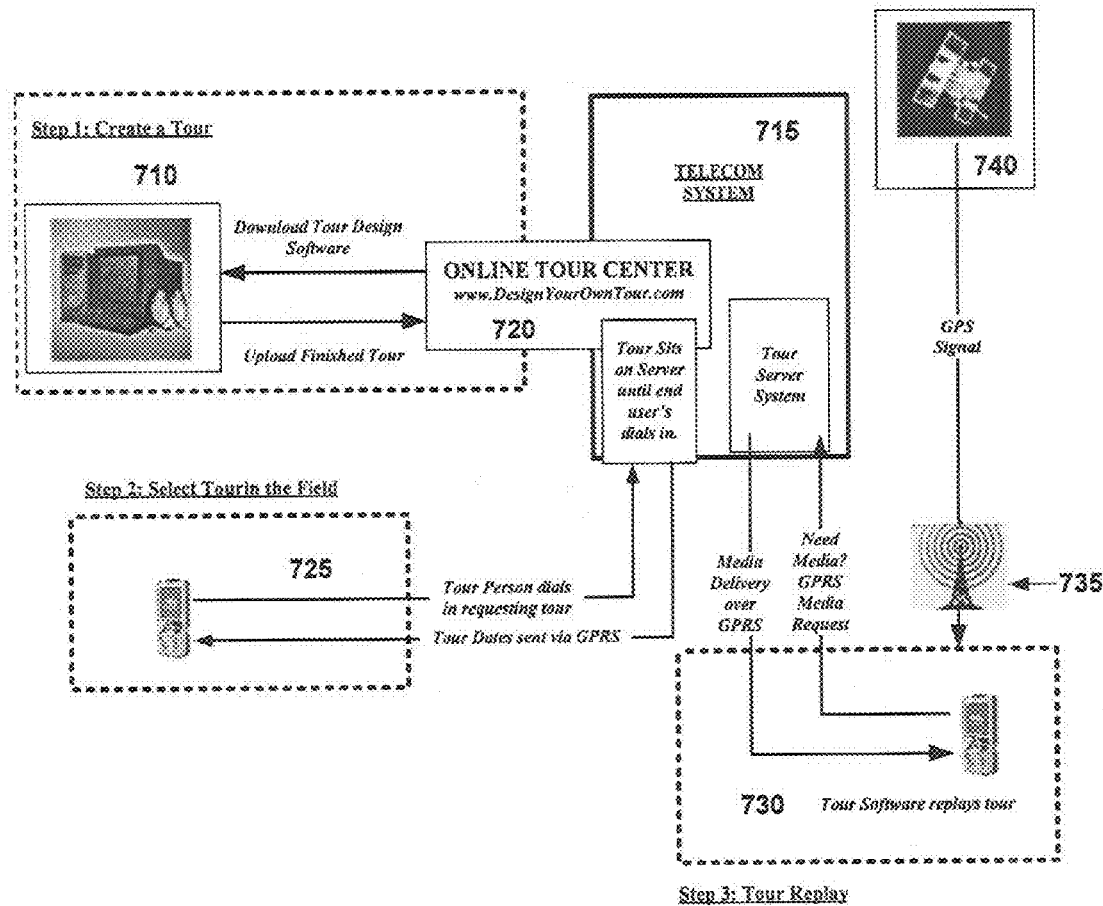
FIG. 7 is a block diagram implementing one embodiment of the present invention.

FIG. 7 illustrates one embodiment of the present invention in which a tour is transferred from a telecom system to a user via GPRS. In this embodiment, a designer creates a tour 710 and uploads the tour to an online database 720, such as the imaginary www.designyourowntour.com. This online database 720 resides within the logical telecom system 715 block.

When a user wishes to select a tour 725, they send a request to the telecom system 715, and the tour is transferred to user 725 via GPRS. Alternatively, a user can play the tour without transferring it locally, by playing the tour off the telecom system 715. In this arrangement, the user 730 specifies the tour to be played to the telecom system 715. The telecom system 715 then runs the tour locally and transmits the tour in real-time to the user 730. In either case, a GPS satellite 740 transfers information about the user's location through an antenna 735.

Figure 8:
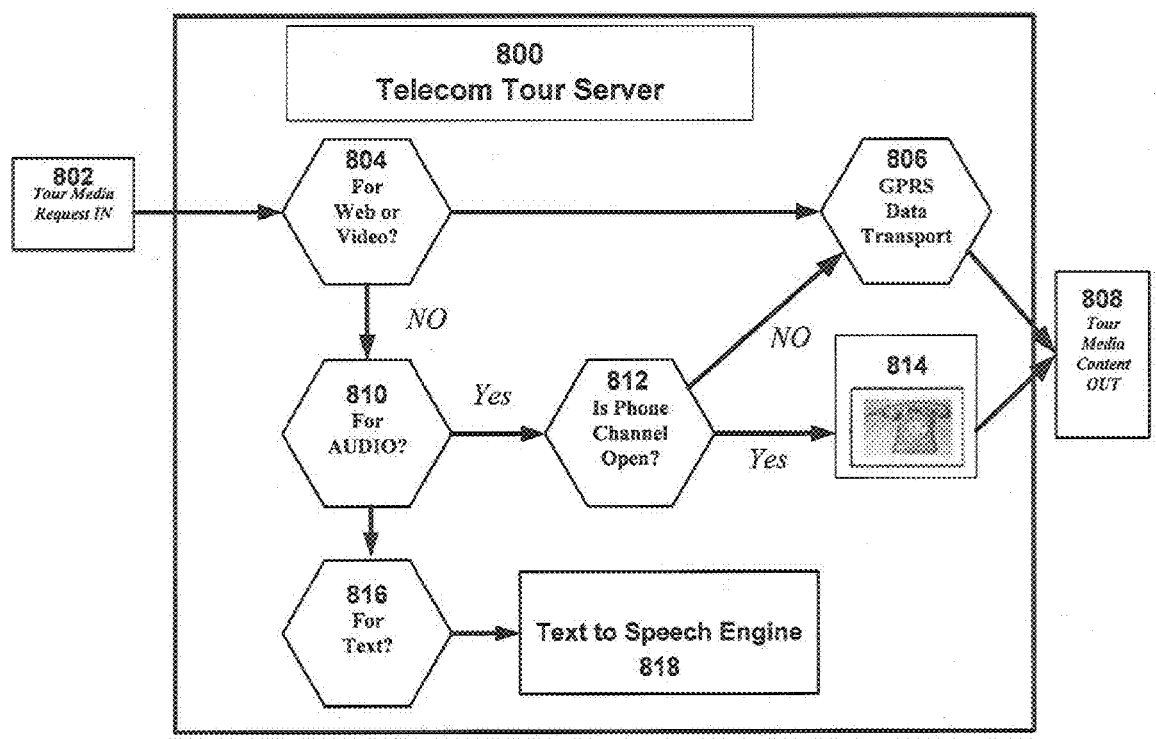
FIG. 8 is a block diagram implementing one part of one embodiment of the present invention.

FIG. 8 illustrates a portion of the telecom system 715 in FIG. 7, the tour server system. The tour server 800 receives a media request 802 from the user. The tour server 800 determines whether the request is web or video media 804. If so, the request is routed via GPRS data transport 806 to the output back to the user 808. If the request is not web or video 804, but is for audio 810, then the tour server 800 determines whether a phone channel is open and available 812. If so, the request is routed through the channel 814 and to the output 808. If not, the request is routed via GPRS data transport 806 to the output 808. If the request is not web, video, or audio, but is for text 816, then the media is translated to speech via a text to speech engine 818. The result is routed through a phone channel 814 if a phone channel is open 812, and through a GPRS data transport 806 if the phone channel is not open 812. In either case, the media request is output to the user 808.

Server Device 260

The server device 260 is where a tour is designed, and it may be any personal computer that is widely available. When the tour server is started, the following actions occur:

The current database is opened
A list of tours from the current database is displayed
The media player 230 is started
The tour server communications engine is started
A menu is presented to the user from the main screen allowing the user to do any of the following:
    View a list of all tours, devices 200, places 332, media clips 342, media lists 336, conditions 330, map files or language 320
    Add or Edit any item in the current form
    Start, Stop, Pause or Resume the tour simulator
    Verify the current tour
    Get Help
When viewing a list of the tours, devices, places (FIG. 3 332), media clips 342, media lists 336, conditions 330, map files or language 320, when the user selects "add" or "edit" from the menu, the appropriate form for each item will be opened.

User Interface 202

Tour Form

The tour form allows the user to create, modify, test, deploy and monitor tours. The process of creating and editing a tour is primarily done through the tour editor dialog. This allows the user to assign a name to the tour, attach languages to the tour, attach the trigger components 322 with their condition specifiers and media clips 342, and view the tour on a map.

Map Display

The map display shows any data that is applicable to spatial design of the tour. This includes:

Locations that are associated with the trigger components 322 of the tour
GPS data, typically depicting street centerlines, city blocks, public parks and open space, bodies of water and other geographical information
Logged data, showing where a device running the tour has been
Trace data, showing the last known location of any device running the tour received from the telemetry relay engine (FIG. 2 270)

Map Layer Operation

Each type of data is separated into one or more layers, which can be turned on or off as appropriate to help the tour designer configure the tour. Whenever data on the map changes, the system takes the map produced from the layer immediately below the one being drawn, copies it, draws its own data on top of this copy, and then marks all the visible layers above it as being in need of a redraw. The system then redraws each successive layer from the changed layer to the top.

It is therefore best practice to have data that is unlikely to change at the bottom of the set of layers, with dynamic layers at the top. For example a map may have four layers; at the bottom is street centerlines, then logged data, then the tour locations, and lastly the telemetry relay engine 270 display layer. When the map is initially displayed, the operating system instructs the map to draw. The map determines that the current map in memory for the topmost layer is initially marked as being not valid. It then proceeds down the layer list looking for a valid layer to draw upon. Since this is the first draw, no layer will be valid, so the bottom layer (street centerlines) is drawn in memory, and a copy of this drawing is passed up to the logged data layer. The logged data is drawn over the street map. This is kept in memory and passed to the next layer, where the tour elements are drawn over this copy. Finally it is passed to the topmost layer, which draws initially nothing on the layer, copies it and shows the output on screen.

When the user moves a location associated with a trigger component 322 in the tour, the tour elements layer becomes invalid, so it takes the last valid output from the logged data layer, makes a new copy of it, draws the newly configured tour on it, and again passes it to the telemetry layer, which shows it onscreen. If any telemetry data comes in, the system draws on a copy of the tour component layer and shows this on screen. This system allows the map display to work in a very fast, more efficient manner.

Visual Tour Design

The map display allows the user to create a highly accurate tour for a remote area without needing to visit the tour area. When the map data for a required tour area is loaded into the map, the initial display will cover the entire map area. The user can then zoom into this area using the mouse to show any area, large or small, and design the tour elements in the desired space. New tour trigger elements may be inserted at will, or existing elements can be selected and moved to any location, using options on the context menu for the map. The user can also add any conditions 330 necessary for each trigger component 322 through another element on the context menu of the map.

In the case where a place specifier is attached to a tour trigger component 322, the trigger 322 will be represented on the map by a boundary line representing the surface limits of the place specifier.

In the case where both a condition and place specifier are attached to a tour trigger component 322 and the condition specifier refers to direction of travel, the trigger will be represented on the map by a boundary line representing the surface limits of the place specifier, with a filled section running from the center of the surface limits of the place specifier angled outward towards the boundary, indicating the direction of travel that is required in order to activate the trigger component 322. Different colors may be used to indicate different condition specifiers.

Language (FIG. 3 320)

The user can select a set of languages 320 from the list of all known languages in the system and add them to the tour. Media lists 336 in this language must then be added to the system.

Device Form

The system keeps a record of each device that carries and runs its tours. When a new device is attached, a new identifier is added to the database for this device. Each device record can record the serial number of the device, a description of the make and model of the device, and a description of the vehicle where the device is installed. When the device is in contact with the tour server, using the tour server communications system, the user will be able to monitor the activity in the device form, and perform ad hoc operations on the device by sending appropriately formatted messages to the device.

Place Form

The place form allows the user to specify the physical boundaries of a place specifier. In most cases this will be a simple "infinite height cylindrical" place specifier, with a only central location and radius.

Unlike the place form on the mobile device, this form allows the user to create simpler or more complex places 332 by selecting the number of dimensions that bound the place specifier, and determining the geographical extents of each dimension.

The user specifies the number of dimensions, the shape of the boundary for that dimension (linear, circular or infinite) and the latitude, longitude and altitude or radius as appropriate.

In the case where the place specifier is a simple line, for example "the 38$^{th}$ parallel," the user would indicate that the specifier is a line, running from 38 degrees North, 180 degrees West, at sea level, to 38 degrees North, 180 degrees East, also at sea level.

For two dimensions, the user enters selects that the place is a plane, and specifies the latitude, longitude and altitude of each corner of the plane, or center and radius of the plane if it is circular. For three dimensions, the eight volume limits are entered, or radii, as appropriate.

Media Clip Form

The media clip form, as on the tour server device 260, allows the user to select the name, source media list 336, and media type of a media clip 342.

Media List Form

The media list form allows the user to create and edit media list 336 items. These items need not necessarily be attached to tours when they are created. This form consists of the following components:

An input area to add or edit the name of the media list 336

An area showing the constituent elements of the media list 336, including media clips 342 and any other media lists 336 and their subcomponents OK and Cancel buttons The main menu "Add" and "Remove" options allow the user to add, edit or delete any media list 336 from the media list 336 being edited, through another copy of the media list form. In addition, the menu allows the user to add, edit or delete a media clip 342 in the media list 336 through the media clip form. Also, the menu allows the user to save the current configuration or to cancel the changes made and close the form.

Condition Form

The condition form allows the user to select a condition 330 type, set optionally either a maximum or minimum value for the condition 330, or both, as well as a name for the condition 330. OK and Cancel buttons allow the user to save the condition 330 parameters or to close the form and abandon the changes that have been made.

Map File Form

The map file form allows the user to enter the data parameters of a Global Information System (GIS) shape data file that will be displayed on the tour designer map. The user may specify a name for the layer that the map file will occupy, as well as a projection type (e.g. Lambert Conical Conformal, two-projection), and the source file name.

Some file formats allow the geographical boundaries of the file to be stored inside the file. In other cases, the user will enter the geographical surface on the map file form. The user may indicate on this form that the layer should be hidden or visible when the map is first loaded. If the GIS data in the file contains shapes, the user may specify that they should be filled by default here also. Finally, the user may select the color in which the file will be displayed.

Files entered into the system through the map file form are not attached to tours through this system. Instead, they go into a global map file collection, from where they can be added to a selected tour in the tour form's map file selection area.

Language Form

The user may add, edit and remove files from the global language 320 collection through the language form. The name of the language 320, and the directory path element that will be associated with the language 320, are specified in this form.

Tour Component Form

The user may add, edit and remove tour components from a tour using the tour component form. The user may specify if the component is a trigger component 322 or a translation component.

Translation Component Entry

Translation components 326 must have a name, a media list 336, and an associated directional condition specifier. No location specifier is allowed.

Trigger Component Entry

Trigger components 322 must have a name, an optional location specifier, an optional set of condition specifiers, and a media list. In the case where the user would like to edit the location, condition or media list elements of a tour component, the form allows this function using Edit buttons as appropriate.

Tour Content Delivery

Tour content can be delivered through the tour Server 260 to the client device 200 using the following methods:

Tour server communications engine (Wireless or Wired)
Native database replication
Device Log Data Recovery Logged data can be retrieved from the device to the tour server using the following methods:

Tour server communications engine (Wireless or Wired)
Native database replication
Tour Server Communications Monitor The tour server communications monitor preferably runs on its own thread. It is constantly awaiting communications messages from devices that are running the tour server application. When a new session is established with a device, the appropriate device form is found and the resulting conversation can be seen on the "connection" page of the form. If the form is not already visible in the system, it is loaded automatically.

Tour Server Communications Messages

The tour Server 260 and client device 200 can exchange messages including but not limited to:

Requests
Start Conversation
End Conversation
Device Identification Request
Software Version Identification Request
Tour Data Request
Language Data Request
File Summary Request
Ping Request
Mode Request
Privileged Mode Request
Play File Request
Delete File Request
Uncompressed File Transfer Request
Compressed File Transfer Request
Database Transfer Request
Settings Change Request
Serialized Object Transfer Request Replies
Action succeeded
Action Failed
Tour Information
Language Information
File Summary
Ping Reply
Privilege Mode Information
File Not Found
Error
Task Percentage Completion
Database Design Information
Database Content Information
Serialized Object Information
Settings Information These messages may be sent in many formats, including XML and plain text.

Client Device 200

The client device 200 is a remote device in the field, which receives content from the server device 260 and provides selected content to a user.

Startup

When the system is first turned on, the following actions occur:

Preferably, an introductory screen is shown to the user to indicate that the system has been started.
The type of interface is determined (Expert or Simple mode)
The application engine 210 is started, preferably on a background thread
The application engine 210 consists of:
Database engine
Database synchronization engine
Collection of tours
Condition monitor 220
Tour Server communications engine
Telemetry relay engine 270
Media player 230
Logging system When the application engine 210 is started, the following actions occur:

The location monitor 225 is started, using data derived from either a real source such as a GPS receiver, or a simulated source such as logged data from the database
The desktop communications system is started
The condition monitor 220 is started, using the location monitor 225 and any other sources of conditional information
The media player 230 is started
Local configuration data is read from a local file
Logging levels are set, using configuration information
The database engine is started
The database specified in the local settings is opened, or if it is not present, a copy of the database is requested from the desktop system, using the desktop communications system
If the database engine has been successfully started, the system loads the current tours
The location relay service is started, preferably on a background thread
The condition preview engine 245 is started, preferably on a background thread
The user feedback monitor is started, preferably on a background thread Once each tour is loaded, the system verifies the integrity of each tour using the tour verification process described below.

Processes

The processes operating on the client device 200 in one embodiment are depicted in FIG. 2. The user interface 202 offers a user both a playback mode 204 and a design mode 206. Both modes, and all processes within the client device 200, are run by a central application engine 210. The application engine 210 interacts directly with user interface 200 to provide seemingly direct communication between the user and the system. Further, user feedback 215 is fed directly into the application engine 210 for processing by the appropriate system process. Application engine 210 communicates with condition monitor 220 to determine what conditions 330, as may be required by the trigger point 100, are satisfied. This process occurs periodically, as dictated by clock 228. Location monitor 225 provides information from a location-sensing device about location, velocity, rate of incline or decline, etc. This information is interpreted by condition monitor 220 and compared against preset conditions 330 associated with various trigger points 100. Condition monitor 220 communicates with media player 230 to prepare media lists 336 to display on an output screen or speakers 238. This speculation is done by the condition monitor 220 based on the information provided by location monitor 225. Media player 230 uses a text-to-speech engine 235, if necessary, to translate written text into audio files. This information is provided through file caching engine 240, through condition preview engine 245, and finally to server communication engine 250.

Tour server communication engine 250 attempts to create a communication link between the client device 200 and a server device 260. Further feeding into the server 260 is telemetry relay engine 270, which continually checks to see if a network connection is available to provide more updated information from the location-sensing device to the server 260.

More detail on each of the foregoing processes is described below.

Condition Monitor 220

The condition monitor 220 provides all the parameter information, which drives the tour. Examples of parameter information include: location or speed information provided by a location monitor 225, time information provided by a clock 228, information about other components in the system provided by the trigger condition monitor, and various external criteria provided via a communications system.

Location Monitor 225

The location monitor 225, usually a GPS-satellite receiver device, provides information about the current latitude, longitude, altitude, direction and velocity of the device, as well as the quality and precision of the satellite signal.

When the condition monitor 220 detects that conditions 330 relevant to a tour have changed, it sends a signal containing an indication of the type of condition and a measurement of that condition to each of the elements of the relevant tour.

For example, if a tour has a condition that requires the user to be informed that the sun will set in an hour the condition monitor 220 will send a signal to the tour whenever the clock 228 ticks. If a tour has components that are sensitive to location, the tour will receive a notification whenever the location monitor 225 determines that location has changed. If a tour controller, usually located at the tour rental location, sends a message to the device using the communications system, this is passed on to the tour via the condition monitor 220.

When a tour receives a message from the condition monitor 220, each component of the tour checks the new condition information to see if it has any relevance to the particular component. The tour component then acts on the information accordingly.

The most common conditional component is a direction of motion condition, associated with a location. In such a case, a media list 336 associated with a particular trigger point 100 will only be played when the device is traveling in the required direction and remains within the required location.

Off Route Calculation

The location monitor 225 can detect how far the device 200 is from the correct route of a tour by selecting a set of the nearest place specifiers in the tour, and comparing the current straight-line distance from the device to the center of each place specifier and the distance between each place specifier. Dividing these two measurements gives an off-route factor, which can then be sent to the condition monitor 220 for examination. For example, if the two nearest places 332 on a tour are 200 meters apart, and these two places 332 are an average of 2000 meters from the device, the off-route factor is 2000/200, which is 10. If the tour designer has specified that a media list 336 should be played in the case that the device moves beyond an off-route factor of 9, then this trigger component 322 would be instructed to play when this condition was true.

Odometer/Speedometer Derived Signal Enhancement

When the device is equipped with a system to relay the odometer or speedometer information from a car in which it is installed, the location monitor 225 can use this information as a secondary source of location information in the case where the primary source, for example GPS, has experienced a loss of accuracy.

Trigger Condition Monitor

The trigger condition monitor examines the state of the trigger components 322 in a tour, and derives conditional information from them. This information is then sent to the condition monitor 220 for processing. The most common use of the trigger condition monitor is to allow the tour designer to include tour components that are not active in the tour until other trigger components 322 have been triggered. For example, if the tour designer wanted to create a treasure hunt, each point on the tour is inactive until the point immediately preceding it has been triggered.

Tour Verification Process

The tour sends a signal to each trigger component 322 to verify the integrity of each component 322 in its current configuration to ensure that, should the trigger component 322 be required to play its media, the relevant files in the required languages are available to play. This is preferably done on a background thread. The signals use the same mechanism that the condition monitor 220 uses to initiate playing the files, but the signal carries an indication that the trigger need only verify the integrity of the file, and not actually play it.

Component Objects 300

Component objects 300 operate within the client device 200, and form the outline upon which a tour is organized. FIG. 3 shows the hierarchy of these objects, with a diamond shape indicating that one object interacts with a multitude of other objects, and a circle indicating that an object interacts with only one other object. Tour menu 310 has four objects: languages 320, trigger components 322, map layers 324, and translation components 326. Each trigger component 322 has four objects: conditions 330, places 332, language script items 334, and media lists 336. Media lists 336 also relates to translation components 326, as well as with media clips 342. The conditions 330 object interacts with condition type 340, which feeds information directly to conditions 330 object.

Tour Objects 300

The device can load and run many tours at once. Each tour has the following components:

A set of tour components

A set of available languages 320

Tour Components

A tour component can be either a trigger component 322, or a mapping component.

Mapping Components

Mapping components are used to convert absolute directions to relative directions. For example, a tour designer can script a place on a tour at which they wish to point out a view to the north. If the device activates the trigger by arriving at this place from the east, the mapping will convert the absolute direction "North" to the relative direction "to your right."

Mapping components work by having a set of media lists 336 associated with ranges of relative directions, for example "to your left" and "to your right." When resolving which media list 336 to play, the system compares the absolute direction of travel to the direction indicated in the trigger component 322, and selects the required media list 336 from the mapping.

Trigger Components 322

Trigger components 322 contain a media list 336, which is to be played when the component is activated, as well as an optional place specifier and an optional set of condition specifiers. Trigger components 322 also contain an information descriptor, which allows the tour designer to classify the type of information that will be relayed to the user when the associated media list 336 items are played. This in turn allows the device to offer a "free roaming" mode where directional information is not played to the user but they can still experience the rest of the tour.

Media Lists 336

A media list 336 is composed of a set of multimedia items that can be played to the user. These items can be individual media clips 342, such as audio or video files, or other media lists 336 or list breakpoints. In this way, media lists 336 can contain many other media clips 342. Media lists 336 may share media clips 342, and trigger components 322 may share media lists 336.

Media Clips 342

A media clip 342 consists of a name for the clip 342, an identifier that gives a simple name for a list (not including any directory information) that contains the media, and an indicator as to the type of media (e.g. MP3, video, etc) found in the list. Media clips 342 also have an information descriptor to allow the tour designer to specify the type of information held in each media list 336.

Place Specifiers

The place specifier is a set of data that indicate a place. This can be done using a central location given by latitude, longitude and altitude, horizontal radius and height, or by defining the boundaries of the place using geographical boundary lines, specified in one, two or three dimensions. For example, a place specifier can refer to any location west of a particular street by defining the one-dimensional line that runs down the street. Another place specifier can use two dimensions to indicate a city block, or the area bounded by a circle around a latitude and longitude. A more complex place specifier can indicate a three-dimensional volume, such as the approach path to a runway, or a regulated volume of airspace.

Condition Specifiers

A condition specifier consists of an indication of the type of data that the condition describes, such as direction, velocity, or time, a first limiting value and a second optional limiting value. Examples of conditions represented using a condition specifier would be "traveling over 35 miles per hour," or "between 10 am and 11:30 am," or "heading within 30 degrees of due east."

Language Specifiers

A language specifier is a set of data that represents the language and the subdirectory component where files containing content in that language can be found.

List Breakpoints

A list breakpoint is an element in a media list 336 that causes the system to review the condition that initially caused the media list 336 to be played. When a list breakpoint is encountered in the process of playing each item in a media list 336, the condition is reviewed, and if it is found to be no longer "set," for example if the user has moved position or changed speed, then the playback of the media list 336 is halted at this point, and all subsequent items in the media list 336 are cancelled from the queue of media lists 336 to be played.

Information Descriptors

Information descriptors include, but are not limited to:
Safety information, such as warnings about hazards in the immediate area
Traffic information, such as instructions to turn left or right
Descriptive information, such as the history of a nearby building
Mixed information, which would include information of many of these types
Mechanisms
Rich Messaging The system uses rich messaging to send signals from different components and processes. Rich messaging allows signals with different meanings to be transmitted along identical pathways. For example, the media player 230 sends rich messages to the tour components, some of which cause the media lists 336 to be played, while others simply cause the tour component to verify that the files are present, or prepare them to be played shortly.

Signal Throttling

When a GPS or other location deriving device is in motion, the location sensing hardware is capable of generating a large amount of data about the changing nature of the location, including rapidly changing speed, direction of travel, and location in three dimensions. Also, the quality of signal can improve or degrade depending on signal source and, in the case of GPS signals, environmental factors such as the amount of open sky that is visible.

The user can control the throttle levels through controls provided on the options form.

Signal Rate Throttle

In order to prevent the volume of data from overwhelming the processing power of the portable device, the signal throttle level may be set to limit the maximum number of signals that are passed to the location engine in a given time period. For example, the system can be set to process only four signals every two seconds. A timer determines when each two second interval has elapsed. When more than four signals have been received in each timing period, they are ignored until the timer indicates that a new period has started.

Signal Quality Throttle

When the signal quality of the location drops, the precision and accuracy of the location information provided in the signal degrades. In situations where the tour designer determines that the locations on the tour are too close to each other to allow the system to take account of less accurate signals, the system can be configured to ignore signals whose quality drops below the required minimum threshold, using the signal quality throttle. Signal quality is often measured in DOP (Dilution of Precision).

Subsystem Engines

Figure 4:
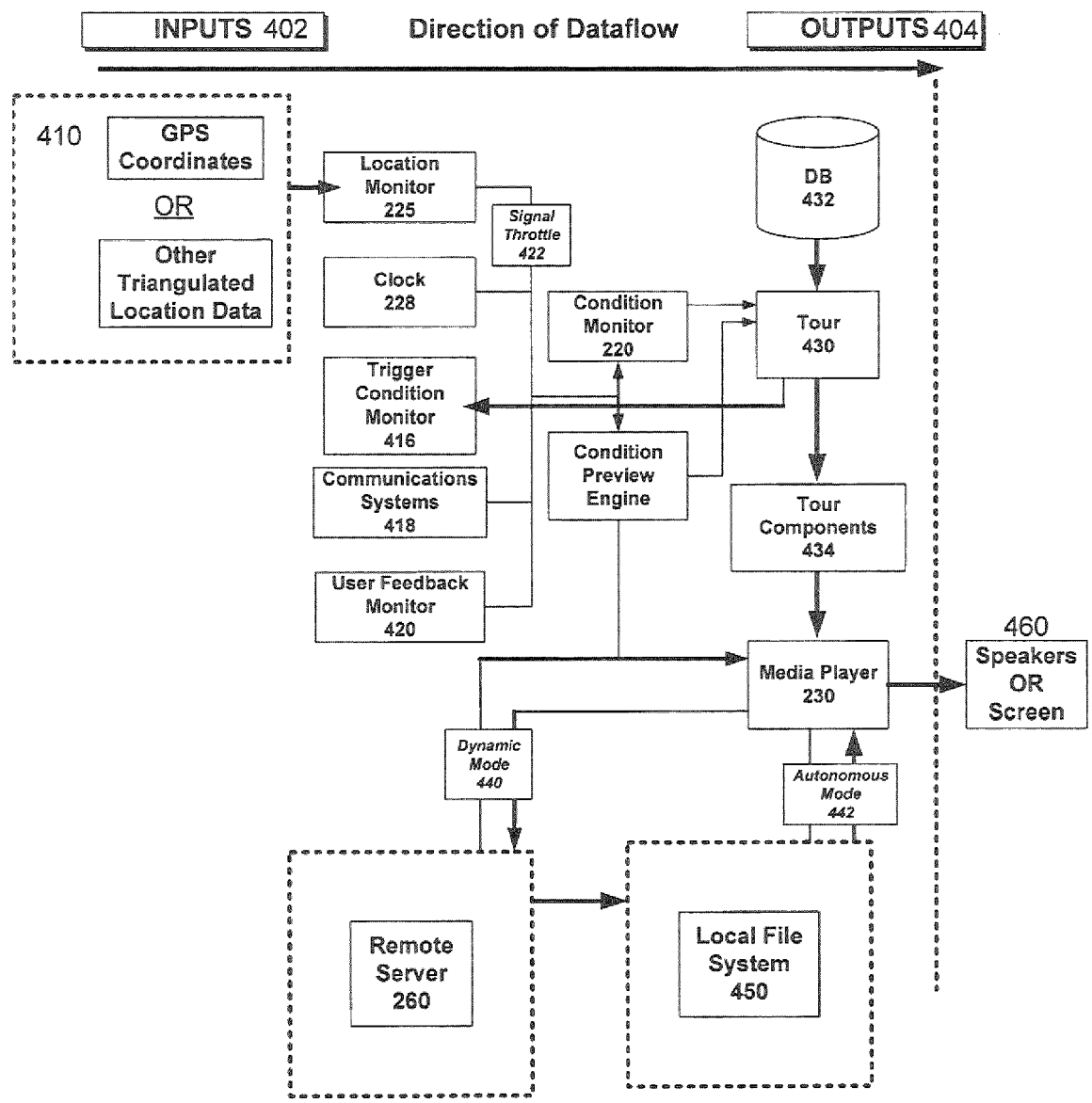
FIG. 4 illustrates the flow of data in an exemplary client device.

The flow of data from input 402 to output 404 in an exemplary client device 200 is shown in FIG. 4. Input 410 is in the form of GPS data or other triangulated location data, which is passed to location monitor 225. Signal throttle 422, clock 228, trigger condition monitor 416, communications system 418 and user feedback monitor 420 feed data to condition monitor 220 and condition preview engine 245. Tour 430 takes data from database 432 and feeds information back to trigger condition monitor 418 as well as to tour components 434. Tour components 434 sends the media file to media player 230, which either interacts with remote server 260 in dynamic mode 440 or local file system 450 in autonomous mode 442 to output media clips on a speaker or screen 460.

Condition Preview Engine 245

The purpose of the preview engine 245 is to identify which trigger components 322 in the tour are most likely to be triggered. This mechanism is for optimization purposes. If the system is so configured, rich messages from the condition monitor 220 are passed to the condition preview engine 245. This then forwards a modified version of each rich message to each tour, which in turn passes the message to each component in the tour.

In order to achieve this, the parameters of the rich message from the condition monitor 220 are broadened to include a wider scope. For example, any trigger component 322 that is found within a fairly large radius of the current location is identified, as are any timed components that are coming close to their trigger time. Velocity components are usually always identified as likely to be triggered, since velocity changes occur very often.

Once a set of components has been identified using the condition preview engine 245, this set of components is passed back to the requesting mechanism, usually the file caching engine 240.

File Caching Engine 240

The file caching engine 240 is designed to optionally allow the device to simultaneously store all the media lists 336 required by many different tours in many different languages, avoiding or mitigating any storage constraints. Each list 336 is stored in a compressed format on the device. When the condition preview engine 245 determines that a list 336 may be needed in the near future, a decompressed version of the relevant list 336 is prepared for the media player 230. A least-recently-used algorithm is employed to dispose of lists 336 that are no longer deemed likely to be needed for imminent playback.

Tour Server Communications Engine

The tour server communications engine preferably runs on a background thread. This engine is constantly trying to establish a digital data communications link with a tour server 260 over the Internet, using any network transportation layer available, including wired connections via USB or COM ports, or via radio-based wireless links such as 802.11 (Wi-Fi), Bluetooth, or any other available hardware.

When a connection to the tour server is available, a number of services are provided for the device 200. These are:

Tour data updates
Media list delivery
Tour Data Updates

Tour data updates allow the device 200 to query the tour server 260 to confirm that all the component parts of the current tours are up-to-date. Any components that are out-of-date are preferably delivered to the device using XML serialization, and seamlessly inserted into or deleted from the current tour without any need for human intervention and without needing to reload the tour.

Media List Delivery

Media list delivery allows the device to inform the tour server 260 that the media lists 336 required to play a given tour are not present on the device 200. The tour server 260 then initiates delivery of the files to the device 200, using a parallel communications channel to the one used to establish the primary connection to the tour server 260. This can happen if the user changes the language of choice on the device 200, or if the device 200 has been configured to be permanently connected to the tour server 260 and therefore does not need to carry any of the media lists 336 locally on the device 200. In the case where the device 200 has both telephonic and digital service available, the audio media can be delivered over the telephone channel while the rich messages that trigger this delivery are sent over a digital channel such as GPRS.

Telemetry Relay Engine 270

The telemetry relay engine 270 preferably runs on a background thread. This engine takes advantage of any wireless networking hardware that may be installed in the device 200. If such hardware is available, the telemetry relay engine 270 periodically checks to see if a connection is available through any wireless technology to the Internet. If such connectivity is available, the system attempts to establish a connection to a tour Server 260, whose address is specified in configuration information on the device 200. Once such a connection is established, the last known location, direction, velocity and time provided by the location engine are sent to the tour server 260. The connection is then closed. This system allows the tour controller, usually situated at the rental location, to determine the location of the device 200 in real time on their computers.

Media Player 230

The media player 230 is responsible for delivering the audio and video experience to the user. This is accomplished by playing the components of media lists 336 that are passed to the media player 230. Each media clip 342 that is found in a media list 336 is played in order, unless interrupted by a rich message indicating that playback can stop. In the case where the media list 336 is stored in uncompressed audio format, the media player 230 simply streams that audio to the user over the relevant media delivery channel. In the case where the audio is stored in a compressed audio format, such as an MP3 file, the media player 230 will decompress this file as needed and stream the resulting uncompressed audio to the user in the same manner as above. In the case where the media lists 336 are stored in compressed archives, such as ZIP files, the media player 230 is responsible for extracting the necessary files in preparation for playing them. In the case where the media to be played is a video file, the media player 230 is responsible for initiating and monitoring the rendering of the video through third-party video playback. In the case where no media lists 336 are available for playback, or no media is provided, the media player 230 will convert the scripts associated with the media clip 342 into audio using a text-to-speech engine 235. The media player 230 is also responsible for determining what action is to be taken in the event of a media collision. This occurs when a media clip 342 is ready to be played, but the previous media clip 342 has not finished. Dependent on parameters defined in the tour or from the system configuration, in such a case the media player 230 will take one of the following actions:

Play the new file immediately on completion of the last one (Concatenation)
Play the new file immediately and discard the remainder of the last one (Preemption)
Ignore the new file (Abandonment)
Logging Subsystem The logging subsystem is responsible for committing the details of relevant system events to the database for later examination by the tour server.

The database can contain many different types of logging events, each with their own severity level and own event type. For example, there are events that are application events such as startup and shutdown, there are location changing events, and there are system error events. The user can control the amount of data that is logged by changing the severity level for each type of event. If, for example, it is desirable to monitor the movement of the device but not to record the startup or shutdown of the device, the user would increase the logging level for application events to above the required threshold for location movement logging, and reduce the logging level for application events.

Events currently defined in the system include:
Location changed
Velocity changed
Tour trigger component media started
Satellite reception lost
Satellite reception acquired
Location monitor off route detected
Clock timer expired
Clock time event
Tour arrived home
Tour started
Tour stopped
Cached file prepared
Cached file purged
Application started
Application stopped
Application error
Unclassified/miscellaneous
User Feedback Monitor The user feedback monitor preferably runs on a background thread. This is responsible for monitoring the user feedback keys, which allow the user to request that the last media list 336 is replayed, or that the configuration of the tour is changed, for example if they want to return to the rental location. User feedback keys may be connected to the device using hardware wiring or Bluetooth, or another radio system.

Expert Mode User Interface
Expert Mode Main Form

Expert mode allows the user to create and modify almost all elements of a tour. The main form consists of four primary components:

- Location engine status display
- Tour status display
- Condition monitor status display
- Menu The location engine status display describes a summary of the data coming from the current location monitor 225, either GPS data or logged data from the database, or any other location data provider that is selected. This data describes latitude, longitude, altitude, signal quality, speed and direction.

The tour status display shows the user a summary of the loaded tours, and when necessary shows warning information derived from tour verification process, as well as selected language information.

The condition monitor status display shows details of the most recent condition monitor 220 activity, as well as condition preview engine 245 status messages when in use.

The Menu is composed of four submenus:
- Tour menu 310
- View menu
- System menu
- Help menu

The Tour Menu 310
The tour menu 310 offers the user the following options:
- Starting or stopping tours
- Loading an existing tour
- Editing a tour through the tour edit screen
- Creating a new tour
- Selecting the active language for a tour
- Initiating the synchronization of the database through the tour server
- Exiting the system

The View Menu
The view menu offers the user the following options:
- Display the options form
- Display the moving map

The System Menu
The system menu offers the user the following options:
- Select the current location engine data source (GPS, Logged Data, etc)
- Switching the user interface to simple mode

The Help Menu
The help menu offers the user the following options:
- Initiate the display of help information to assist in using the device
- Display the "About" screen showing licensing, copyright and patent information

Tour Viewer Form
The tour viewer form consists of:
- An input area for describing the name of the tour being created or edited
- A tour components display
- Menu

Tour Name Input
This allows the user to edit the name of the current tour.

Tour Components Display
The tour components display shows the trigger components 322 of the tour, with each trigger component 322 showing each of its conditional sub-components, where appropriate.

Menu
The menu consists of options allowing the user to do the following:
- Add a trigger component 322 based on the current location through the trigger component form
- Add or edit a selected trigger component 322 through the trigger component form
- Remove a trigger component 322
- Save the current configuration of components 322
- Return to the expert mode main form

Trigger Component Form
The trigger component form allows the user to:
- Choose a name for the trigger component 322
- Optionally choose a location for the center of the place specifier that will be a part of the trigger component 322
- Optionally choose a condition 330 that will be a part of the trigger component 322
- Specify the media list 336 that will be played when the trigger component 322 is activated
- Add or Edit a place specifier in the component 322, through the place specifier form
- Add or Edit a condition specifier in the component 322, through the condition specifier form
- Add or Edit a media list 336 in the component 322, through the media list form In one embodiment, the user may plot trigger points 100 onto a map using the mobile device. In this embodiment, the user would be able to associate media lists 336 with the newly plotted trigger points 100, and may create and associate conditions 330 with the trigger point 100. The device may further be configured to allow a user to record audio or video media directly onto the device to create a media clip 342. In this manner, a user might create a number of trigger points 100 as the user moves through a city. At each point, the user can stop and record audio or video about that trigger point 100. This creates an entire tour, which might be uploaded at a later time to the tour server. The trigger points 100, conditions 330, and media clips 342 can then be modified or added to an existing tour using the software on the tour server.

Place Specifier Form
The place specifier form allows the user to manually edit the latitude, longitude, height, altitude and radius of a simple cylindrical place specifier, and to assign a name to the place specifier. A menu is provided to allow the user to save the current configuration of the place specifier, or to close the form and return to the previous form.

Condition Specifier Form
The condition specifier form allows the user to select a condition 330 type, set optionally either a maximum or minimum value for the condition 330, or both, as well as a name for the condition 330. A menu allows the user to save the condition 330 parameters or to close the form and return to the previous form.

Media List Form
The media list form allows the user to create and edit media list 336 items. This form consists of the following components:
- An input area to add or edit the name of the media list 336
- An area showing the constituent elements of the media list 336, including media clips 342 and any other media lists 336 and their subcomponents
- Menu The menu allows the user to add, edit or delete any media list 336 from the media list 336 being edited, through another copy of the media list form. In addition, the menu allows the user to add, edit or delete a media clip 342 in the media list 336 through the media clip form. Also, the menu allows the user to save the current configuration or to close the form and return to the previous form.

Media Clip Form

The media clip form allows the user to select the name and source media list 336 of a media clip 342. A menu is provided to allow the user to save the media clip 342 information or to return to the previous form.

Options Form

The options form allows the user to configure the GPS system, logging levels, signal throttles, moving map settings, database synchronization engine parameters, media player 230, and all other settings on the device 220.

Moving Map

The moving map displays a GPS-based map, centered around the last location provided by the location monitor 225.

Help Form

This provides the user with dynamic help on how to use the system.

Simple Mode User Interface

The simple mode interface consists of four forms:
Simple main form
Simple system form
Simple tour form
Simple language form The simple main form allows the user to choose a single tour, and a single language in which to hear the tour, and to start and stop the tour, or show the simple system form. The simple system form allows the user to stop the application, or attempt to switch the application to expert mode.

Simple Tour and Language Forms

The tour and language forms offer the user the choice of available tours and languages from the database.

While the preferred embodiments of the invention have been described herein, it will be understood that those skilled in the art, both now and in the future, may make various improvements and enhancements which fall within the scope of the claims that follow. These claims should be construed to maintain the proper protection of the invention described herein.

What is claimed is:

1. A live free-roaming multimedia tour for display to a user, comprising:
    a graphical map having a plurality of trigger points plotted thereon, each trigger point of the plurality of trigger points representing a geographical area of any size and shape;
    a condition monitor monitoring a plurality of trigger conditions associated with said plurality of trigger points, said plurality of trigger conditions representing values determinable by a location-sensing device and a timing device, said plurality of trigger conditions being used to monitor the user's locational and temporal states while on the live free-roaming multimedia tour and monitor the state of satisfaction of the trigger conditions; and
    a user interface presenting a plurality of media lists to the user upon satisfaction of at least one trigger condition of said plurality of trigger conditions, wherein the plurality of trigger conditions represent one or more of the following values:
        location of the user;
        speed of the user;
        height of the user;
        velocity of the user;
        rate of incline or decline of the user;
        time spent inside the geographical area represented by a trigger point of the plurality of trigger points;
        time spent since activating one of the plurality of trigger conditions;
        direction of the user; and
        acceleration of the user.

2. The tour of claim 1 wherein said multimedia tour is created on a server device.

3. The tour of claim 1 wherein each of the trigger points resides in three dimensional space.

4. The tour of claim 1 wherein each media list comprises one or more media clips, the media clips being an audio or visual file.

5. A method for a user to create a live free-roaming multimedia tour on a location-sensing device, comprising:
    traveling with the device;
    creating a trigger point when the user is in a desired location;
    associating a plurality of trigger conditions with the trigger point, said plurality of trigger conditions representing values determinable by the location-sensing device and a timing device, the plurality of trigger conditions being used to monitor the user's locational and temporal states while on the live free-roaming multimedia tour and to monitor the state of satisfaction of the trigger conditions; and
    associating a media file with the trigger point, said media file to be presented to the user when the user enters the trigger point or at least one trigger condition of said plurality of trigger conditions is satisfied,
    wherein the plurality of trigger conditions represent one or more of the following values:
        location of the user;
        speed of the user;
        height of the user;
        velocity of the user;
        rate of incline or decline of the user;
        time spent inside the geographical area represented by a trigger point of the plurality of trigger points;
        time spent since activating one of the plurality of trigger conditions;
        direction of the user; and
        acceleration of the user.

6. The method of claim 5 wherein the media file is created by recording audio on the device.

7. The method of claim 5, further comprising the steps of:
    transferring the multimedia tour from the location-sensing device to a server;
    plotting the trigger points on a map generated by a geographic information system; and
    assigning a plurality of trigger conditions to said trigger points.

8. A method for distributing a live free-roaming multimedia tour, comprising:
    creating a multimedia tour comprising a plurality of trigger points, each trigger point of the plurality of trigger points being associated with a plurality of trigger conditions, wherein each trigger condition of said trigger conditions represents values determinable by a location-sensing device and a timing device, the trigger conditions being used to monitor the user's locational and temporal states while on the live free-roaming multimedia tour and to monitor the state of satisfaction of the trigger conditions; and
    storing the multimedia tour on a server connected to a network;
    transferring the multimedia tour to a user on the network, wherein the plurality of trigger conditions represent one or more of the following values:
location of the user;
speed of the user;
height of the user;
velocity of the user;
rate of incline or decline of the user;
time spent inside the geographical area represented by a trigger point of the plurality of trigger points;
time spent since activating one of the plurality of trigger conditions;
direction of the user; and
acceleration of the user.

9. The method of claim 8 wherein the network stores a plurality of multimedia tours, each multimedia tour associated with one or more identifying keywords.

10. The method of claim 9 wherein the user can search the server for a tour based on said identifying keywords.

* * * * *